United States Patent [19]

Hurt

[11] 4,296,474

[45] Oct. 20, 1981

[54] INSPECTION SYSTEM AND APPARATUS THEREFOR

[75] Inventor: James J. Hurt, Bettendorf, Iowa

[73] Assignee: Deere & Company, Moline, Ill.

[21] Appl. No.: 102,016

[22] Filed: Dec. 10, 1979

Related U.S. Application Data

[63] Continuation of Ser. No. 830,412, Sep. 6, 1977, abandoned.

[51] Int. Cl.³ .................. G06F 15/46; G05D 5/00
[52] U.S. Cl. .................. 364/560; 364/474; 364/107
[58] Field of Search ............ 364/560, 107, 111, 474, 364/475, 468, 571, 559; 250/222 R

[56] References Cited

U.S. PATENT DOCUMENTS

| | | | |
|---|---|---|---|
| 3,493,762 | 2/1970 | Dulebohm | 364/571 X |
| 3,633,011 | 1/1972 | Bederman et al. | 364/107 |
| 3,670,153 | 6/1972 | Rempert et al. | 364/559 X |
| 3,967,242 | 6/1976 | Isoo et al. | 364/560 X |
| 3,970,830 | 7/1976 | White et al. | 364/474 X |
| 4,030,201 | 6/1977 | Possati | 364/560 X |
| 4,041,286 | 8/1977 | Sanford | 364/559 X |

*Primary Examiner*—Edward J. Wise

[57] ABSTRACT

A system and apparatus for inspecting machined parts and determining out of tolerance parts includes a coordinate measuring machine for providing signals representative of the actual locations, relative to an arbitrary coordinate system, of features to be inspected in or on the part. An input device provides signals representative of the nominal locations and the allowable tolerances therefrom of the features relative to a predetermined coordinate system. A programmable data processor operating under the control of a program processes the actual and nominal location signals and causes a mathematical translation and rotation of the actual location signals to their closest fit to the nominal location signals relative to the predetermined coordinate system. The processor then compares the nominal and closest fit signals and provides difference signals representative of the differences therebetween for comparison with the tolerance signals to provide out-of-tolerance signals when the difference signals are greater than the tolerance signals. An output device provides indications of the out-of-tolerance signals to indicate when parts are out of tolerance and should be rejected.

10 Claims, 4 Drawing Figures

4,296,474

INSPECTION SYSTEM AND APPARATUS THEREFOR

This is a continuation of application Ser. No. 830,412 filed Sept. 6, 1977, now abandoned.

BACKGROUND OF THE INVENTION

The present invention relates to machined part inspection systems and more particularly to an inspection system which compares the actual locations of a plurality of features and the corresponding nominal locations and allowable tolerances of the plurality of features to determine when the parts should be rejected because a feature fails to fall within the allowable tolerance for the feature.

Currently, the nominal locations and allowable tolerances of a pattern of features on a machined part are generally dimensioned relative to a coordinate system established by the part itself. A typical example is a bolt-hole circle with the bolt holes and tolerances being specified from the center of the bolt-hole circle. In the past, for inspection purposes, the inspection system would establish an arbitrary coordinate system by placing the origin at the center of one bolt-hole and aligning the part so that one of the axes would pass through the center of a second bolt-hole. By the very nature of this inspection system, the erroneous assumptions had to be made that the origin bolt-hole was drilled with no error in location and that the bolt hole at the axis was drilled with no error in location tangential to the origin bolt-hole. Thus, errors in the location of the origin or axis bolt hole would lead to the costly rejection of parts which were actually within the tolerances specified relative to the center of the bolt-hole circle.

SUMMARY OF THE INVENTION

The present invention provides an inspection system in which a programmable data processor operating under the control of a program effectively relocates and repositions the actual pattern of features to most closely fit the nominal pattern of features.

Data from a co-ordinate measuring machine and from an input device are inputed into the programmable data processor. The data processor translates the actual pattern to the best translated location, which is when the centroids of the actual and nominal patterns coincide. At the best translation, the translated pattern is rotated so as to minimize the total area of error circles which are circles having radii equal to the distances between the nominal location of each feature and its corresponding translated feature location. The translated and rotated pattern of features will then be in the coordinate system of the nominal pattern of features for a determination of which features actually exceed the allowable tolerances.

With this inspection system, the best fit between the actual and nominal patterns are obtained and the part will only be rejected when a feature actually falls outside its permissible tolerance.

The above and additional advantages of the present invention will become apparent to those skilled in the art from a consideration of the following detailed description of the preferred embodiment when taken in conjunction with the accompanying drawings.

DESCRIPTION OF THE PREFERRED EMBODIMENT

Figure 1:
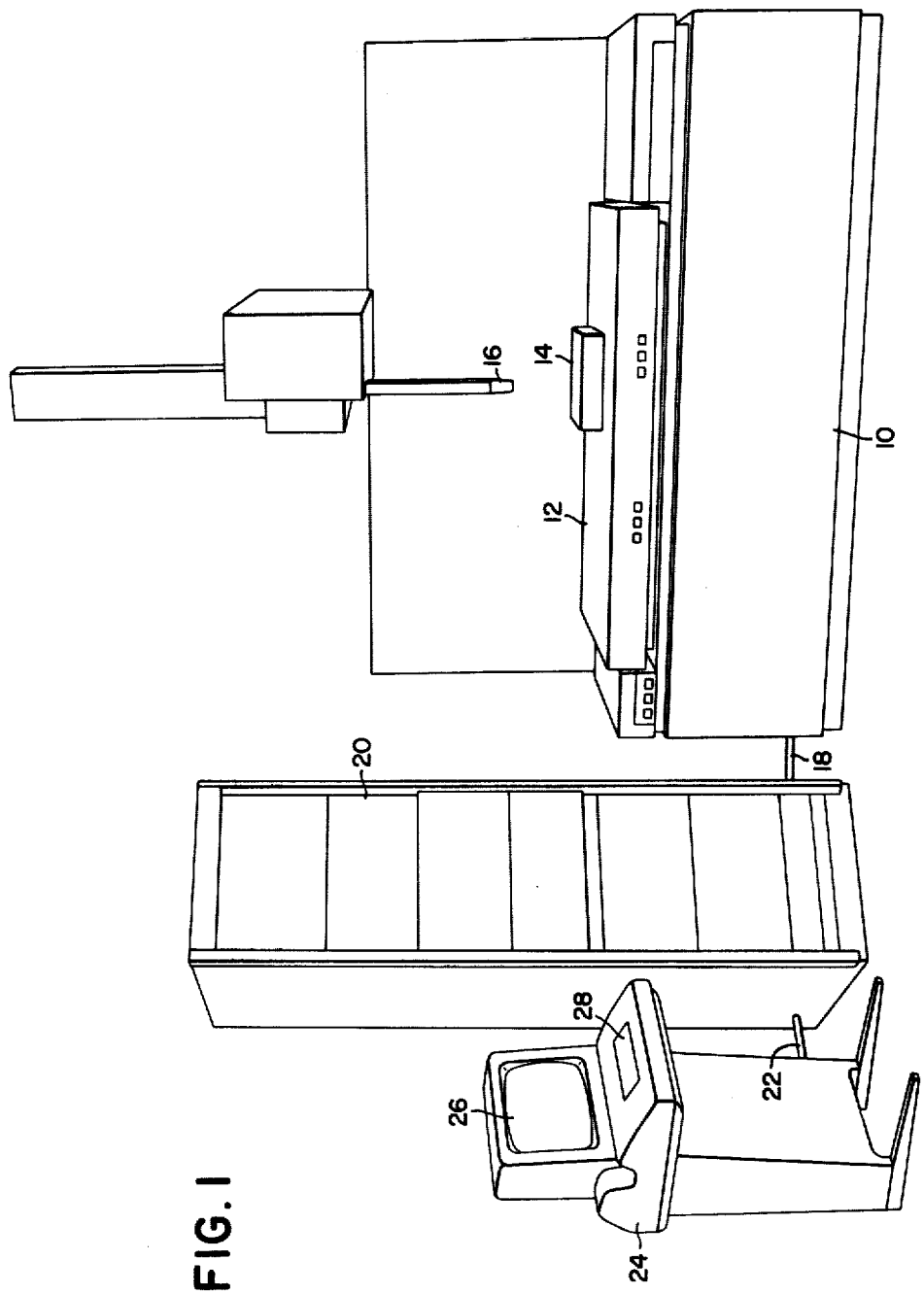
FIG. 1 is an overview of the apparatus which forms the preferred embodiment of the present invention.

Referring now to FIG. 1, therein is shown a coordinate measuring machine 10 of a type which is commercially available from such companies as the Boice Division of Mechanical Technology, Inc. of Latham, New York. The coordinate measuring machine 10 includes a table 12 upon which a machined part, such as the machined part 14, may be placed for inspection by an operator who moves a probe 16 of the coordinate measuring machine 10 into contact with various machined features on the machined part 14. Upon contacting a feature, the probe 16 will cause the coordinate measuring machine 10 to provide three-dimensional, rectangular cartesian coordinate signals representative of the location of the feature relative to a predetermined point in the coordinate measuring machine 10.

The coordinate measuring machine 10 is connected by a cable 18 to a general purpose computer or programmable data processor (PDP) 20. The programmable data processor 20 is of a type generally well known in the art and the equivalents thereof include: the General Automation SPC-16; the IBM 370 TSO; the Control Data Corporation 6000 NOS; and the IBM System 7. In the preferred embodiment, the programmable data processor 20 is a PDP-11 from the Digital Equipment Corp. of Maynord, Mass. The programmable data processor 20 has a memory and is capable of being programmed in U.S.A. Standard FORTRAN to manipulate various inputed signals as will later be explained to provide a processed ouput which will later be described.

The programmable data processor 20 is connected by a cable 22 to a conventional CRT or computer readout-/in terminal 24. The computer readout/in terminal 24 may be of any type capable of inputing and outputing information into a programmable data processor but in the preferred embodiment it is of the type manufactured by the Tektronix Corporation of Beaverton, Oregon which includes a video screen 26 and a keyboard 28. The computer readout/in terminal 24 is capable of inputing both the program as well as basic input data through the keyboard 28 and is capable of providing a readout of computer data on the screen 26.

Figure 2:
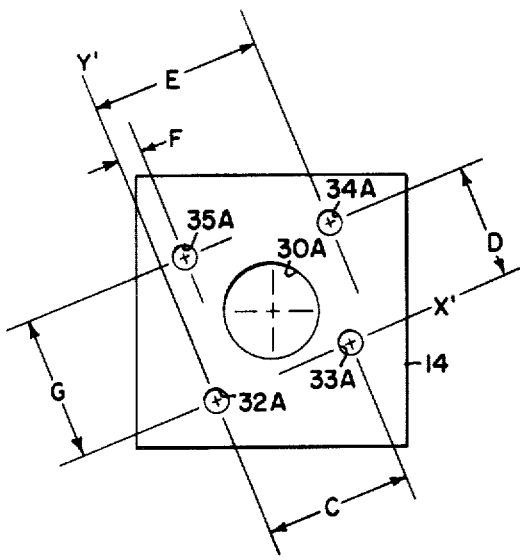
FIG. 2 is a top view of a machined part to be inspected by the present invention.

Referring now to FIG. 2, therein is shown a sample machined part 14 having a number of actual features starting with a center hole 30A and first through fourth bolt-holes 32A through 35A, respectively. Based on an arbitrary X'-Y' coordinate system having its origin passing through the first bolt-hole 32A and its X'—X' axis passing through the second bolt-hole 33A, the first bolt-hole A32 coordinates would be (0, 0), the second bolt-hole 33X coordinates would be (C, 0), the third bolt-hole 34A coordinates would be (E, D), and the fourth bolt-hole 35A coordinates would be (F, G).

Figure 3:
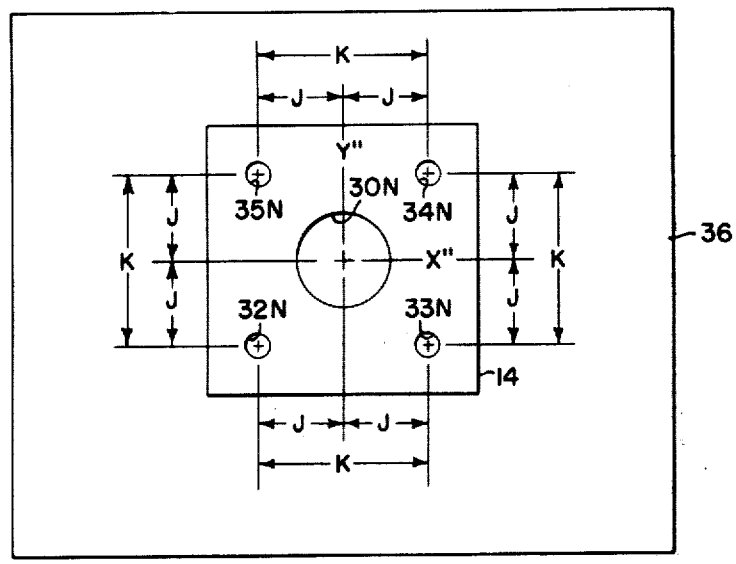
FIG. 3 is a top view of a drawing of the machined part.

Referring now to FIG. 3, therein is shown a simplified drawing 36 of the machined part 14. In the drawing 36 are shown the nominal feature locations. The center hole 30N is at the origin of the X″-Y″ axes from which the first through fourth bolt-holes 32N through 35N are dimensioned and toleranced. Thus, the coordinates of the first through fourth bolt-holes 32N through 35N would be, respectively, (−J, −J), (J, −J), (J, J) and (−J, J). As evident from the drawing 36, the nominal distance between bolt-holes which is given as K will generally not be the same as the actual distance between bolt-holes occurring in the machined part 14 as shown in FIG. 2.

In operation, to inspect the machined part 14, the operator need only place the machined part 14 on the table 12 of the coordinate measuring machine 10. No special positioning of the machined part 14 is required other than to assure that the features to be inspected are all coplanar since the preferred embodiment operates only on two-dimensional data.

The nominal data is entered into the programmable data processor 20 through the computer readout/in terminal 24 from the machine part drawing 36 and the actual data is entered by the operator moving the probe 16 to contact the various features on the part being inspected so as to establish a coordinate system relative to the first and second features and to locate the coordinates of all the features as explained hereinafter.

The operator manually moves the probe 16 into contact with several sides of the first bolt-hole 32A and tells the programmable data processor 20 by means of the computer readout/in terminal 24 that the several contacts define a circle the center of which will be the origin of the X′-Y′ coordinate system. The programmable data processor 20 will then find the center of the bolt-hole 32A and set that as the origin of an arbitrary coordinate system which will be fully positioned when the operator moves the probe 16 into contact with several sides of the second bolt-hole 33A. The centers of subsequent bolt-holes will be determined by this same process and coordinates from the coordinate measuring machine 20 will be inputed to the programmable data processor 20.

In the memory of the programmable data processor 20, an array "A" will be established for multibit data words containing the actual data from the coordinate data measuring machine 20 in the form A(1,i) which indicates the first component of the i-th feature location and A(2,i) which is the second component of the i-th feature location where i goes from 1 to n with n equal to the number of features. A pattern of features on a part has "n" features, for example the machined part 14 has four features or holes.

The memory of the data processor 20 further contains an array "H" for receiving the nominal data. The numbers for H are taken from the part drawing 36 and are inputed through the computor readout/in terminal 24 in the same format as the array A. In the dimension statements for H and A, the first subscript must have a dimension of 2 and the second subscript must have a dimension at least equal to the number of features in the pattern.

The location of the actual or nominal features A and H are represented by two-dimensional column vectors with subscripts used to denote the sequence of vectors. On the machined part drawing 36, these n features are at the positions $H_1, H_2, \ldots, H_n$ and the vectors $H_i$ form the nominal data for the pattern of features. When the actual machined part 14 is inspected, it will be found that these features are actually at the positions $A_1, A_2, \ldots,$ $A_n$ and the vectors $A_i$ form the actual data measured from the actual piece for the pattern of features.

With the machined part 14, the various dimensions J will be typed in on the keyboard 28 as coordinates of the first through fourth bolt-holes 32N through 35N from the machined part drawing 36. The actual data would be entered by the operator moving the probe 16 to the first bolt-hole 32A and contacting any three points on the wall of the hole. The contacts will cause the coordinate measuring machine 10 to provide signals relative to its internal coordinate system to the programmable data processor 20 which operating under the command of a conventional program commonly used with coordinate measuring machines will locate the center of the bolt-hole 32A and establish the center as the origin of the arbitrary coordinate system. A second set of three contacts with the second bolt-hole 33A will locate the center of the bolt-hole 33A and establish the orientation of the arbitrary coordinate system with the X′—X′ axis passing through the center of the second bolt-hole 33A. With the machined part 14, the first through fourth bolt-holes 32A through 35A will be positioned respectively at coordinates (0,0), (C,0), (E,D) and (F,G).

Based on the data in the arrays H and A, the programmable data processor 20 operating under command of the program will compute the centroid of H, designated by $\overline{H}$, according to the equation:

$$\overline{H} = \frac{1}{n} \sum_{i=1}^{n} H_i$$

The programmable data processor 20, computes the centroid of the data in A, designated as $\overline{A}$, according to the equation:

$$A = -\frac{1}{n} \sum_{i=1}^{n} A_i$$

Utilizing the centroid information, the programmable data processor 20 will compute the number $C_1$ according to the equation:

$$C_1 = r \cos(x) = \sum_{i=1}^{n} (H_i - \overline{H})^T (A_i - \overline{A})$$

where the superscript T is used to denote the transpose of the two dimensional column vectors ($H_i - \overline{H}$) into its equivalent two-dimensional row vector. The number $S_1$ is then calculated according to the equation:

$$S_1 = r \sin(x) = \sum_{n=1}^{n} (H_i - \overline{H})^T E(A_i - \overline{A})$$

in which the letter E represents a two by two matrix having the form:

$$\begin{bmatrix} 0 & -1 \\ 1 & 0 \end{bmatrix}$$

Next, the number r is computed according to the equation:

$$r = \sqrt{C_1^2 + S_1^2}$$

Utilizing the above information, the programmable data processor 20 computes the cosine ($\theta$) according to the equation:

$$\cos(\theta) = \cos(x) = C_1/r$$

and further computes the sine ($\theta$) according to the equation:

$$\sin(\theta) = \sin(x) = S_1/r$$

Based on the above calculations, the programmable data processor 20 computes a rotation matrix R which is a two by two matrix to be more fully described later, according to the equation:

$$R = \begin{bmatrix} \cos & -\sin(\theta) \\ \sin(\theta) & \cos(\theta) \end{bmatrix} = \cos(\theta) + \sin(\theta)E$$

where I is a two by two matrix of the form:

$$I = \begin{bmatrix} 1 & 0 \\ 0 & 1 \end{bmatrix}$$

The final computation is that of the two-dimensional column vectors $B_i$ using the equation:

$$B_i = \overline{H} + R(A_i - \overline{A}) \text{ for } i = 1, 2, \ldots, n$$

The mathematical manipulation to reposition the actual data from the locations $A_i$ moves the data to locations designated by the vectors $B_i$ and the programmable data processor 20 operating under the control of the program will replace the data $A_i$ with the data $B_i$ in the array A for further manipulation. At this point the information in arrays A and H are in condition for further manipulation which will be explained shortly.

The conversion of the above procedure into U.S. Standard FORTRAN for utilization in structural cooperation in the digital data processor 20 will be evident to those of ordinary skill in the art.

The mathematical theory for the above programmable data processor calculations begins with the basis that any repositioning and realignment of the actual data from $A_1$ will move it to $B_1$ where $$B_i = Z + RA_i \text{ for } i = 1, 2, \ldots, n.$$

In this equation, the vector "Z" is called the translation and the matrix R, which is called the rotation, has the form for some angle $\theta$.

$$R = \begin{bmatrix} \cos(\theta) & -\sin(\theta) \\ \sin(\theta) & \cos(\theta) \end{bmatrix} = \cos(\theta)I + \sin(\theta)E$$

Figure 4:
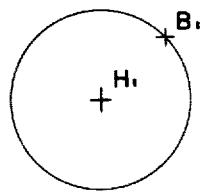
FIG. 4 is a top view of an error circle generated in the preferred embodiment of the present invention.

After translation and rotation, the difference in the location of the i-th feature is $H_i - B_i$. Taking this difference as a radius of a circle, an "error circle", may be formed which is centered at $H_i$ and passes through $B_i$ as shown in FIG. 4. The area of the error circle is directly related to the error in positioning between the nominal and actual feature locations. Therefore, when the total area of all the error circles for all the features can be minimized, the best fit between the actual and nominal feature locations will be obtained.

The area of a single error circle is equal to:

$$\pi(H_i - B_i)^T(H_i - B_i)$$

and thus the total area of all the error circles is:

$$g = \pi \sum_{i=1}^{n} (H_i - B_i)^T(H_i - B_i)$$

Utilizing the general transformation equation $$B_i = Z + RA_i \text{ for } i = 1, 2, \ldots, n$$

in the equation giving the total area of all the error circles and then expanding in Z to determine the best translation of Z as a function of the rotation R, the following equation is obtained:

$$G = \pi \sum_{i=1}^{n} (H_i - Z - RA_i)^T(H_i - Z - RA_i) =$$

$$\pi \sum_{i=1}^{n} (H_i - RA_i)^T(H_i - RA_i) - 2\pi \sum_{i=1}^{n} (H_i - RA_i)^T Z + \pi n Z^T Z$$

An examination of the above equation reveals that it is a quadratic in Z which has a minimum at:

$$Z = \frac{1}{n} \sum_{i=1}^{n} (H_i - RA_i) = \frac{1}{n} \sum_{i=1}^{n} H_i - R\left(\frac{1}{n} \sum_{i=1}^{n} A_i\right)$$

Since $$\overline{H} = \frac{1}{n} \sum_{i=1}^{n} H_i$$

is equal to the centroid of the nominal data and $$\overline{A} = \frac{1}{n} \sum_{i=1}^{n} A_i$$

is equal to the centroid of the actual data, it becomes evident that the best translation Z has the form:

$$Z = \overline{H} + R\overline{A}$$

substituting Z back into the basic transformation equation, the following repositioning equation is obtained:

$$B_i = \overline{H} + R(A_i - \overline{A}) \text{ for } i = 1, 2, \ldots, n$$

This indicates that the best translation for minimizing the area of all the error circles is that for which the actual centroid and the nominal centroid coincide.

Since the best translation Z has been determined, the best rotation R must be found using this best translation. Starting again with the equation for the total area of all the error circles and substituting for $B_i$ with the best translation, the following equation is obtained:

$$g = \pi \sum_{i=1}^{n} [H_i - \overline{H} - R(A_i - \overline{A})]^T [H_i - \overline{H}) - R(A_i - \overline{A}] =$$

$$\pi \sum_{i=1}^{n} (H_i - \overline{H})^T(H_i - \overline{H}) - \pi \sum_{i=1}^{n} (A_i - \overline{A})^T R^T(H_i - \overline{H}) -$$

$$\pi \sum_{i=1}^{n} (H_i - \overline{H})^T R(A_i - \overline{A}) + \pi \sum_{i=1}^{n} (A_i - \overline{A})^T R^T R(A_i - \overline{A}$$

Since R is a two by two matrix, then $R^T$ is a two by two matrix where the components in the (1,2) and (2,1) positions have been interchanged. The form of R means that $R^TR$ is equal to I and thus the first and last terms of the above equation are both independent of R and cannot affect the choice of a best rotation. Further, from an evaluation of the above equation, it is evident that since the second term is a real number, it is equal to its transpose which is the same formula as the third term. Hence, the formula for the total area of the error circle becomes:

$$g = g_0 - 2\pi \sum_{i=1}^{n} (H_i - \overline{H})^T R(A_i - \overline{A})$$

where $g_0$ is a constant which is independent of the rotation R and is equal to $$g_0 = \pi \sum_{i=1}^{n} (H_i - \overline{H}) + \pi \sum_{i=1}^{n} (A_i - \overline{A})^T(A_i - \overline{A}).$$

Seeking to minimize g, and substituting the rotation matrix R in the equation for g, the following equation is obtained:

$$g = g_0 - 2\pi \sum_{i=1}^{n} (H_i - \overline{H})^T(A_i - \overline{A}) \cos(\theta) -$$

$$2\pi \sum_{i=1}^{n} (H_i - \overline{H})^T E(A_i - \overline{A}) \sin(\theta)$$

Observing that the following substitution could be made for a radius "r" and an angle "x" such that:

$$\sum_{i=1}^{n} (H_i - \overline{H})^T(A_i - \overline{A}) = r \cos(x)$$

and $$\sum_{i=1}^{n} (H_i - \overline{H})^T E(A_i - \overline{A}) = r \sin(x)$$

Substituting the above two equations and the equations for the total area of the error circles yields the following equation:

$$g = g_0 - 2\pi r \cos(x) \cos(\theta) - 2\pi r \sin(x) \sin(\theta)$$
$$= g_0 - 2\pi r \cos(x - \theta)$$

Obviously, based on the above equation the total area g is a minimum when the angle $\theta$ is taken equal to the angle x. Since this defines angle $\theta$, R can be determined by the previously described equation: $R = \cos(\theta)I + \sin(\theta)E$.

The above permits calculation of the vectors $B_i$ and thus the best fit position of the actual features on the nominal features according to the previously described repositioning equation:
$B_i = \overline{H} + R(A_i - \overline{A})$ for $i+1, 2, \ldots, n$ Once $B_i$ is in array A, the data entries in the array A can be compared by the programmable data processor 20 with the data entries in the array H and the differences in each of the coordinates between each of the actual and nominal locations can be determined and outputed through the computer readout/in terminal screen 26 in various ways which would be obvious to those skilled in the art. Further, the operator initially would have inputed the allowable tolerances for each of the dimensions and where the differences between the actual and nominal locations exceed the tolerances, the computer readout/in terminal 24 can be made to provide a special indication to allow more rapid rejection of out-of-tolerance parts.

While the invention has been described in conjunction with a specific embodiment, it is to be understood that many alternatives, modifications, and variations would be apparent to those skilled in the art in light of the aforegoing description. Accordingly, it is intended to embrace all such alternatives, modifications, and variations which fall within the spirit and scope of the appended claims.

I claim:

1. An inspection system comprising: a coordinate measuring machine for providing actual data signals representative of actual feature coordinates on a part being inspected relative to an arbitrary coordinate system; data input means for providing nominal data signals representative of nominal feature coordinates on the part relative to a predetermined coordinate system; a data processor responsive to the nominal and actual data signals to process the actual data signals to provide true position data signals representative of the actual feature coordinates repositioned to most closely correspond to the nominal feature coordinates in the predetermined coordinate system; and data output means responsive to the true position data signals to provide an output representative thereof.

2. The inspection system according to claim 1 wherein the data processor includes means responsive to the actual data signals to mathematically translate the actual feature coordinates to the locations most closely approximating the nominal feature coordinates and providing translated feature coordinates representative thereof, means responsive to the translated feature coordinates to mathematically rotate the translated feature coordinates to the locations most closely approximating the nominal feature coordinates and providing true position data signals representative of the translated and rotated coordinates.

3. The inspection system according to claim 2 wherein the data input means includes means for providing tolerance data signals representative of the acceptable tolerances of the coordinates of the nominal feature locations, the data processor includes means for comparing the nominal and true position signals and providing difference data signals representative of the differences between the nominal and true position location coordinates, the data processor includes means for comparing the tolerance and difference data signals and providing out-of-tolerance signals when the difference data signals are greater than the tolerance data signals, and the output means includes means responsive to the out-of-tolerance signals to provide an output representative thereof.

4. The inspection system according to claim 3 wherein the data processor includes means to make the out-of-tolerance signals proportional to the differences between the difference and tolerance data signals.

5. An inspection system comprising:
   (A) A coordinate measuring machine for sensing the locations of features on a part being inspected and generating actual data signals identifying the actual locations by coordinates relative to a predetermined coordinate system;
   (B) data input means for providing nominal data signals identifying the nominal locations of the features on the part by coordinates relative to the predetermined coordinate system;

(C) a data processor responsive to the actual and nominal data signals, including means for:
(1) converting the nominal data signals into nominal data entries in an array H of multibit data words,
(2) converting the actual data signals into actual data entries in an array A of multibit data words,
(3) computing the centroid $\overline{H}$ of multibit data words in the array H,
(4) computing the centroid $\overline{A}$ of the multibit data words in the array A,
(5) computing the best translation of the centroid $\overline{A}$ as a function of rotation which will superimpose the centroid $\overline{A}$ on the centroid $\overline{H}$,
(6) computing the best rotation at the best translation which will most closely superimpose the multibit data words in the array A on the multibit data words in the array H,
(7) computing true position data signals identifying the new coordinates after the best translation and rotation of the multibit data words in the array A,
(8) converting the true position data signals into true position data entries in the array A; and (D) data output means for providing an output representative of the true position data entries.

6. The inspection system according to claim 5 wherein the data input means includes means for providing tolerance data signals representative of the acceptable tolerances of the coordinates of the nominal feature locations, the data processor includes means for comparing the nominal and true position data entries and providing difference data signals representative of the differences between the nominal and true position location coordinates, the data processor includes means for comparing the tolerance and difference data signals and providing an out-of-tolerance signals when the data signals are greater than the tolerance data signals, and the output means further includes means responsive to the out-of-tolerance signals to provide an output representative thereof.

7. The inspection system according to claim 6 wherein, the data processor includes means to make the out-of-tolerance signals proportional to the differences between the tolerance and difference data signals.

8. An inspection system comprising: a coordinate measuring machine for providing actual data signal representative of actual feature coordinates of a number of features on a part being inspected; data input means for providing nominal data signals representative of manual feature coordinates of the number of features on the part; a data processor responsive to the actual and nominal data signals to:
(1) convert the nominal data signals into nominal data entries in an array H of multibit data words,
(2) convert the actual data signals into actual data entries in an array A of multibit data words, and
(3) compute the centroid of the data entries H according to $$\overline{H} = \frac{1}{n} \sum_{i=1}^{n} H_i$$

where n is the number of features and i is the i-th feature location ranging from 1 to n,
(4) compute the centroid of the data entries in A according to $$\overline{A} = \frac{1}{n} \sum_{i=1}^{n} A_i,$$

(5) compute C according to $$C = \sum_{i=1}^{n} (H_i - \overline{H})^T (A_i - \overline{A})$$

where the superscript T denotes the transpose of the column vector $(H_i - \overline{H})$ to its row vector,
(6) compute S according to $$S = \sum_{i=1}^{n} (H_i - \overline{H})^T E (A_i - \overline{A})$$

where E is the matrix $$\begin{bmatrix} 0 & -1 \\ 1 & 0 \end{bmatrix}$$

(7) compute r according to $r = \sqrt{C^2 = S^2}$.
(8) compute $\cos(\theta)$ according to $\cos(\theta) = C/r$,
(9) compute $\sin(\theta)$ according to $\sin(\theta) = S/r$,
(10) compute the rotation matrix R according to $R = \cos(\theta) I + \sin(\theta) E$ where I is the matrix $$I = \begin{bmatrix} 1 & 0 \\ 0 & 1 \end{bmatrix}$$

(11) compute the repositioned feature signals B according to $B_i = \overline{H} + R(A_i - \overline{A})$,
(12) convert the repositioned feature signals into repositioned data entries in the array A, and
(13) provide true position data signals representative of the repositioned data entries in the array A,
(14) compare the nominal and true position data entries in the arrays H and A and provide error data signals representative of the differences therebetween; and data output means for providing an output representative of the error data signals.

9. The inspection system according to claim 8 wherein the data input means includes means for providing tolerance data signals representative of the acceptable tolerances of the coordinates of the nominal feature locations, the data processor includes means for comparing the nominal and true position data entries and providing difference data signals representative of the differences between the nominal and true position location coordinates, the data processor includes means for comparing the tolerance and difference data signals and providing an out-of-tolerance signals when the data signals are greater than the tolerance data signals, and the output means further includes means responsive to the out-of-tolerance signals to provide an output representative thereof.

10. The inspection system according to claim 9 wherein, the data processor includes means to make the out-of-tolerance signals proportional to the differences between the tolerance and difference data signals.

* * * * *